United States Patent
Matsuda

[15] 3,667,357
[45] June 6, 1972

[54] AUTOMATIC CONTROL DEVICES FOR A CAMERA

[72] Inventor: Motonobu Matsuda, Sakai-shi, Japan
[73] Assignee: Minolta Camera Kabushiki Kaisha, Osaka, Japan
[22] Filed: Dec. 12, 1969
[21] Appl. No.: 884,568

[30] Foreign Application Priority Data

Dec. 24, 1968 Japan..................................43/94807
Dec. 31, 1968 Japan......................................44/728
Feb. 24, 1969 Japan..................................44/16349

[52] U.S. Cl. ..........................................95/10 CT, 95/53 EB
[51] Int. Cl. ..................................................G03b 7/08
[58] Field of Search....................................95/10 C, 53, 53 E

[56] References Cited

UNITED STATES PATENTS

| | | |
|---|---|---|
| 3,310,679 | 3/1967 | Babish..................................95/10 C X |
| 3,418,904 | 12/1968 | Wick et al.............................95/10 C |
| 3,500,729 | 3/1970 | Rentschler et al. ..................95/10 C |
| 3,504,604 | 4/1970 | Kitai....................................95/10 C |
| 3,522,763 | 8/1970 | Dietz....................................95/10 C |

*Primary Examiner*—Joseph F. Peters, Jr.
*Attorney*—Watson, Cole, Grindle & Watson

[57] ABSTRACT

An automatic exposure control device for a camera is actuated by outputs from two separate delay circuits. The first delay circuit includes means for storing an electrical signal in accordance with the brightness of an object to provide a first output, and the second delay circuit includes means for storing an electrical signal representative of a desired flash time delay to provide a second output. A switching circuit is responsive to the first and second outputs whereby a flash circuit is actuated only when the second output exceeds the first output. A modified embodiment incorporates a third delay circuit and the flash is actuated only when the first output is less than the third output or when the first output exceeds the third output which in turn exceeds the second output. The first and second delay circuits are respectively responsive to the brightness of the entire picture and a central portion of the picture, whereas the third delay circuit provides the desired flash time delay.

6 Claims, 14 Drawing Figures

INVENTOR

Motonobu Matsuda

BY
Watson, Cole, Grindle & Watson
ATTORNEY

INVENTOR
Motonobu Matsuda
BY
Watson, Cole, Grindle & Watson
ATTORNEY

INVENTOR
Motonobu Matsuda
BY Watson, Cole, Grindle & Watson
ATTORNEY

AUTOMATIC CONTROL DEVICES FOR A CAMERA

BACKGROUND OF THE PRIOR ART

In the prior art, it is well known that by detecting the brightness of an object the flash circuit is opened and closed automatically in response to the detected value. In such a device the voltage difference between a photosensitive element and a detection comparison resistance is detected in the beginning process of the shutter release operation. The flash circuit is opened and closed in response to the size of the voltage difference so as to change over to daylight photography or flash photography, however, along with that it is impossible to automatically select the proper exposure time for the respective types of photography and at the same time to control electrically the shutter speed. And, when the brightness of an object is satisfactory for EE photography, after the voltage difference is detected it is possible to do EE photography by a successive shutter release operation. However, after the shutter control is adjusted for the value suitable for flash photography the shutter release should be operated and attempting to change it over automatically only complicates the control circuit and mechanism unnecessarily.

SUMMARY OF THE INVENTION

In order to obviate the drawbacks mentioned above, the present invention relates to a photographic camera wherein the switching circuit for the electric shutter is operated by the output of a first electric delay circuit including a photoconductive element, the time constant of which is changed in accordance with the brightness of the object, and the output of a second electric delay circuit in parallel with the first electric delay circuit. The second delay citcuit has a definite time constant which is selected for flash photography. The output difference between the first and second electric delay circuits con-trols the opening and closing of a switch for the flash circuit. When the brightness of an object is high and in the range suitable for EE exposure control, the electric shutter is controlled by the first electric delay circuit and the output difference between the first and second electric delay circuits holds the switch for the flash circuit open. When the brightness of an object is low and in the range unsuitable for EE exposure control, the output of the second electric delay circuit holds the electric shutter at a shutter speed required for flash photography and the output difference of the first and second electric delay circuits closes the first switch to automatically energize the flash device in response to opera-tion of the release mechanism.

The primary object of the present invention is to provide an electric shutter capable of adjusting the shutter speed in response for exposure brightness of an object to the control in daylight EE photography and the exposure control suitable to the other special photographing.

BRIEF DESCRIPTION OF THE DRAWINGS

FIGS. 12(A), (B), and (C) are illustrations showing the light and dark relation of an important object and the background in a picture, wherein

DESCRIPTION OF THE PREFERRED EMBODIMENT

Figure 1:
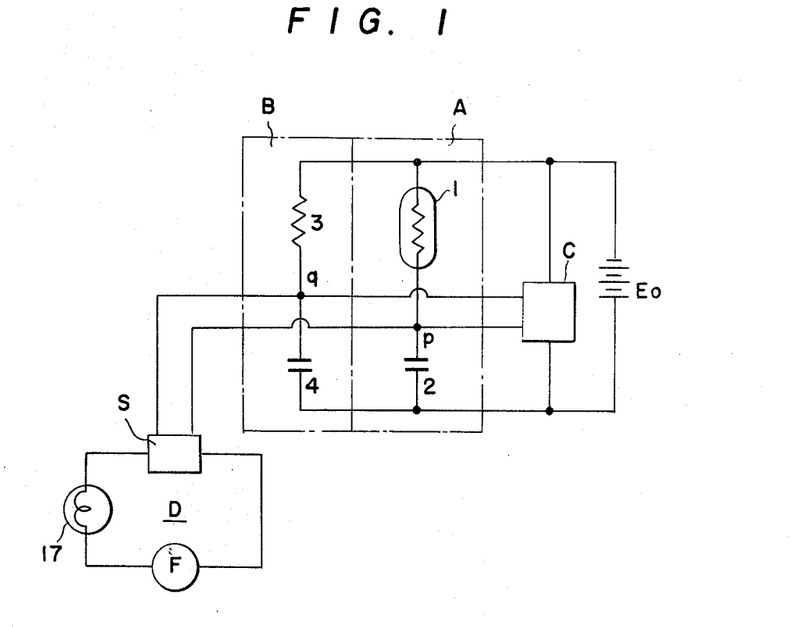
FIG. 1 is a block diagram showing the constitution of the first embodiment in accordance with the present invention.

With reference to FIG. 1, A is a delay circuit composed of photoconductive element 1 and condenser 2 and having a delay time which varies in accordance with the brightness of an object. B is a delay circuit having a fixed delay time set and composed of a fixed resistance 3 and condenser 4. C is a switch circuit for controlling the shutter mechanism, which operates when the respective input signals reach a fixed level, which input signals are the respective voltages at points p and q.

Figure 2:
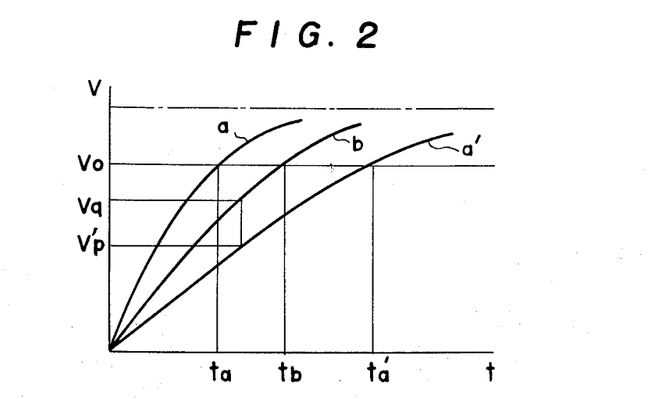
FIG. 2 illustrates the charging voltages for the delay circuits of FIG. 1 as a function of time for both bright and dull conditions.

FIG. 2 shows the charging voltages of both condensers 2 and 4 in delay circuits A and B, wherein curve b shows the voltage of condenser 4 in circuit B, which is set by resistance 3 the charging voltage for circuit A is variable as shown by curves $a$ and $a'$, and curve a represents a bright object and the resistance of photoconductive element 1 is low, and curve $a'$ represents a dark object with a high resistance of photoconductive element 1.

Vo shown in FIG. 2 is the voltage at which switch circuit C is operated in FIG. 1, and as described above switch circuit C is formed so as to operate when the charging voltage of either condenser 2 or 4 in delay circuits A and B reaches Vo. If the charging voltage of condenser 2 has the characteristic shown by curve a in FIG. 2, the operative time of the switch circuit, namely, the shutter speed is $ta$, and relative to $tb$, which is the time it takes condenser 4 to reach Vo. The shutter speed $ta'$ represents the charging time of condenser 2 for a dull object and, $ta' > tb$ thus the operative time of the switch circuit does not exceed $tb$.

Thereupon, when values of resistance 3 and condenser 4 are set up for a certain specific value relative to power source Eo and is set up for the longest exposure time, for example, thirty milliseconds which does not allow the shaking of the camera to affect the photography, even though the brightness of an object produces a lower exposure time, the shutter speed is not slower than 30m.s.

In such a case, the relation between curve b and curve $a'$ in FIG. 2 is always $Vq > V'p$ and this fact shows that between point q and point p in FIG. 1 there is always a positive electric potential. And accordingly, in the present invention, by operating switch S for flash circuit D making use of said positive electric potential as control signals flash 17 is lit.

Figures 3, 4:
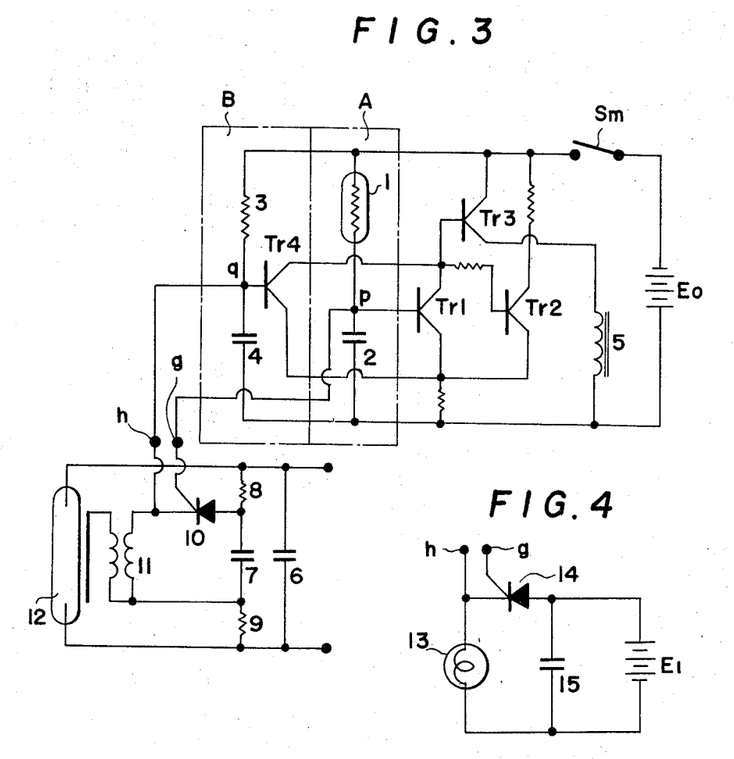
FIG. 3 is a schematic diagram a circuit for the embodiment of FIG. 1.
FIG. 4 shows a variation of a flash circuit used in the present invention.

Referring to FIG. 3 to understand in detail the first embodiment, switch circuit C shown in FIG. 1 is formed by a Schmidt trigger circuit.

Transistor Tr1 is the first stage transistor receiving the voltage of condenser 2 as an input signal, and transistor Tr4 is the first stage transistor receiving the voltage of con-denser 4 as an input signal. The aforementioned Schmidt circuit is formed by transistor Tr4 and transistor Tr2. And, transistor Tr1 or Tr4, both normally non-conducting, are more conductive when the voltage of condenser 2 or 4 reaches voltage Vo, which causes transistor Tr3 to be conductive as well. Thus, electromagnet 5, in the collector of transistor Tr3 is magnetized so as to actuate the closing process of the shutter.

For a flashing device in FIG. 3, flash discharge tube 12 is used and terminals p, q of condensers 2, 4 are connected to terminals g, h of the flashing device. Resistances 8, 9 and condenser 7 therebetween are in parallel with flash discharge tube 12 and connected to a power source. The primary circuit of transformer 11 includes condenser 7 and SCR10, and the gate thereof is connected to terminal g and terminal h is connected to the cathode of SCR10. Therefore, when the electric potential of point p which conforms to curve a' shown in FIG. 2, becomes higher than the electric potential of point q, SCR10 becomes conductive and flash discharge tube 12 is lit.

The exposure time does not become longer than tb and yet when tb>t'a flash discharge tube 12 is lit for flash photography. Therefore, provided Tb is approximately 30m.s. the picture is not affected by a shaking of the camera, and when the brightness of an object requires a longer exposure time, it is possible to change over automatically to flash photography.

FIG. 4 shows a flash circuit provided with flash lamp 13 to be connected to terminals g, h of the exposure time control device shown in FIG. 3, and also in this case when in Vp>Vq SCR14 becomes conductive, and by the discharge current of condenser 15 flash lamp 13 can be lit.

Figure 5:
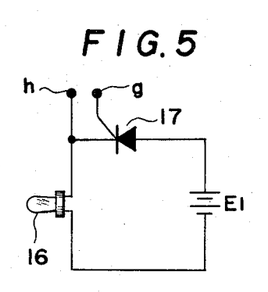
FIG. 5 shows a circuit for indicating an under-exposure condition.

FIG. 5 shows a device to be connected to terminals g, h shown in FIG. 3 for indicating an underexposure condition. When Vp>Vq exposure shortage indicating lamp 16 is lit to annunciate that the brightness of an object is in the under-exposure range for daylight EE photography.

Figure 6:
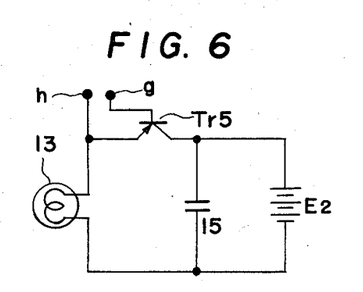
FIG. 6 shows a variation of a flash circuit.

FIG. 6 shows another embodiment of an automatic flash device making use of the flash lamp shown in FIG. 3 wherein, the discharge circuit of condenser 15 is connected to flash lamp 13 through the emitter and the collector of transistor Tr5. The base of transistor Tr5 is connected to terminal g, and the emitter is connected to terminal h. And, when Vp>Vq, transistor Tr5 is conductive and flash lamp 13 is lit.

Figure 7:
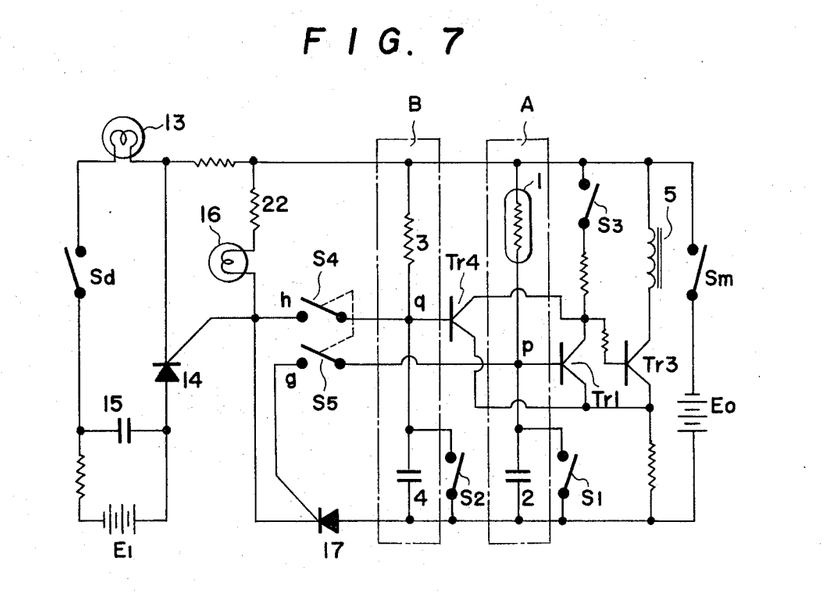
FIG. 7 is a circuit diagram of the second embodiment of an automatic flash circuit.

In the second embodiment of the present invention shown in FIG. 7, the brightness of an object is detected and the circuit determines whether conditions are suitable for the daylight photography or flash photography and the flash photography condition is annunciated. The exposure control of the electric shutter is set to the exposure time for meeting the conditions for flash photography and the flash device is operated. If the brightness of an object is suitable for daylight photography the annunciation device and the flash device are not operated.

In FIG. 7, the same symbols as those for the first embodiment denote the same parts. Parallel with power source Eo and power switch Sm are delay circuit, A composed of photoconductive element 1 and condenser 2 and having a delay time changeable in accordance with the brightness of an object, and circuit B composed of a fixed resistance 3 and condenser 4, and having a fixed delay time.

Both condensers 2, 4 are provided with short-circuit switches S1, S2 respectively, and when these switches are opened both condensers start to be charged. Such short-circuit switches can also be provided for both condensers 2, 4 in the first embodiment shown in FIG. 3 as well.

Connecting points p, q between the resistance and the condenser in said both delay circuit A, are connected respectively to the bases of first stage transistors Tr1 and Tr4 in the Schmitt circuit, and the collector circuits of both transistors Tr1, Tr4 are connected to the base of second stage transistor Tr3 in the Schmitt circuit and to the negative side of the power source through a resistance and operation switch S3.

Points p, q are connected respectively to terminals g, h through interlocked switches S4, S5.

A annunciation circuit is connected in parallel with both delay circuits to power source Eo and power switch Sm. The gate of SCR17 in the annunciation circuit is connected to terminal g, the cathode thereof is connected to terminal h, and annunciation lamp 16 and resistance 22 are connected in series to SCR17.

And, to the negative side of resistance 22 there is connected the cathode of SCR14, the gate of SCR14 is connected to the positive side of the annunciation lamp, and SCR14 is in the discharge circuit of condenser 15 which is connected to power source E1 in series with flash lamp 13 and synchro switch Sd.

Figure 8:
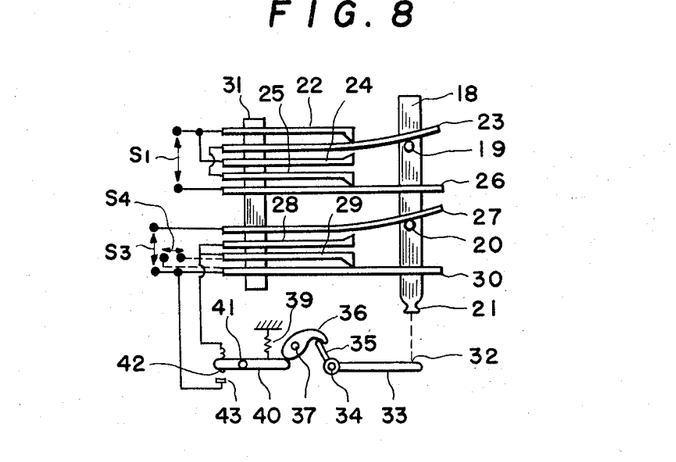
FIG. 8 is a side view showing the constitution of a mechanical switch used in the embodiment of FIG. 7.

A mechanism for opening and closing switches S1, S2, S4, and S5 is shown in FIG. 8. Release button 18 is biased to a fixed position and is provided with two projecting pins 19, 20 on its side and working protrusion 21 on its lower end. Contact piece 23 which is bent upward by projecting pin 19 against its elasticity comes into contact with contact 22 and is biased to come into contact with lower contact 24 because of its elasticity. And, the tip of contact piece 26 is normally biased to come into contact with contact 25 and projects into the descending track of projecting pin 19. On the other hand, the upward movement of projecting pin 20 causes contact piece 27, biased to normally come into contact with lower contact 28 through its elasticity, to separate therefrom. The tip of contact piece 30 is normally in contact with contact 29 and projects into the descending track of said projecting pin 20, the aforementioned contacts are all mounted on insulating plate 31.

Into the descending track of working protrusion 21 of release button 18, one end 32 of bent lever 33 is pivoted on pin 34 and the other arm 35 of bent lever 33 engages with the head pawl portion of lever 36 pivoted on pin 37, and its tail portion engages with the end portion of contact lever 40 pivoted on pin 41 which is biased to turn counter-clockwise by means of spring 39. Movable contact 42 formed on the other end of lever 40 faces contact 43. Contact 22 is electrically connected to contact 24, contact piece 23 is connected to contact 24, contact 28 and contact 29 are connected to each other and to movable contact 42 of contact lever 40, and contact 30 is connected electrically to fixed contact 43.

Between contact 22 and contact 26 short-circuit switch S1 is formed, and short-circuit switch S2 is also formed in the same way as short-circuit switch S1 so as to open and close in interlocking relationship with switch S1. Working switch S3 is formed by contact piece 27 and contact piece 30, switch S4 is formed by contact 29 and contact piece 30, and switch S5 is also formed in the same way as switch S4 so as to be closed in interlocking relationship with switch S4.

In FIG. 8, therefore, by pressing down release button 18 power switch Sm is closed and then contact piece 23 is separated from contact 22 to release the short-circuit across condensers 2, 4, so that each of these condensers starts respectively to be charged. And at the same time, working switch S3 is also closed to effect the operative state of the Schmidtt trigger circuit composed of transistors Tr1, Tr4, and Tr3.

And, while condenser 2 is charged by the current running through photoconductive element 1 in accordance with the reflected light from an object, condenser 4 is charged by the fixed current running through fixed resistance 3. Therefore, when the brightness of the object is higher than the fixed value, the charging voltage of condenser 2 is larger than that of condenser 4, and electric potential Vp of point p becomes lower than electric potential Vq of point q, namely, Vp>Vq. SCR17 remains in a non-conductive state, however, in when the brightness of the object is lower than the fixed value, the charging voltage of condenser 4 is larger than that of condenser 2 and the electric potentials of points p, q are Vp>Vq. Therefore, as the gate and cathode of SCR17 are respectively connected to points p, q, SCR17 is switched to the conductive state, the current runs through the annunciation circuit, and annunciation lamp 16 is lit. The voltage across annunciation lamp 16 and resistance 22 is impressed between the gate and cathode of SCR14 in the flash circuit to cause SCR14 to be conductive, however, synchro switch Sd in the flash circuit remains open, so that flash lamp 13 is not lit.

On the other hand, because short-circuit switches S1, S2 are opened and working switch S3 is closed, each of transistors Tr1, Tr4, and Tr3 forming the Schmitt circuit can be operated, however, the opening process of the shutter is not started mechanically yet, so that the operation of the electric shutter is not effected.

In the second place, when release button 18 is further pressed down, contact piece 23 is released by projecting pin 19 and starts to come into contact with contact 24 short-circuit switch S1 is closed through contact 25 and contact piece 26, and in the same manner short-circuit switch S2 also closed. Both condensers 2, 4 are short-circuited, and points p, q are at the same electric potential as the power source.

By further depressing release button 18 projecting pin 20 engages contact piece 30 to break the contact with contact 29, so that working switch S3 is opened and simultaneously switches S4 S5 are also opened.

By the above procedures, even though the electric potentials of points p, q are the same, or switches S4, S5 are opened and the voltage difference impressed between the gate and cathode of SCR17 in the annunciation circuit is absent, SCR17 remains in its conductive state to keep annunciation lamp 16 lit.

When release button 18 is further depressed, projecting pin 19 pushes down contact piece 26 to break the contact with contact 25, so that short-circuit switches S1 and S3 are opened again to start to charge condensers 2, 4, and simultaneously working protrusion 21 on the lower end of the shutter button engages with one end 32 of bent lever 33 to turn it clockwise so as to actuate the release of shutter. Simultaneously therewith arm 35 turns the pawl portion of lever 36 counter-clockwise to break the engagement of its tail portion and contact lever 40, and variable contact 42 comes into contact with fixed contact 43 to close working switch S3 again so as to bring the electric shutter to the operative state.

In this case, in a condition of low brightness of an object as SCR17 in the annunciation circuit is conductive the charging voltage of condenser 4 is larger than that of condenser 2, so that transistor Tr4 is first rendered conductive, and by its collector current transistor Tr3 is made non-conductive so as to cut off the exciting current to electromagnet 5 to actuate the closing process of the shutter.

With shutter synchro switch Sd for the flash circuit closed, and because of the current flowing through the annunciation circuit, SCR14 becomes conductive and flash lamp 13 is lit. And, in order that the annunciation circuit remains in the conductive state, when the brightness of an object is high the voltage of point p is at first lower than the fixed voltage, and transistor Tr1 is initially conductive and transistor Tr3 is non-conductive, whereby the shutter is closed at a shutter speed corresponding to the brightness of an object. In this case, the annunciation current does not flow, so that the flash circuit is also not conductive and flash lamp 13 is not lit.

Figure 9:
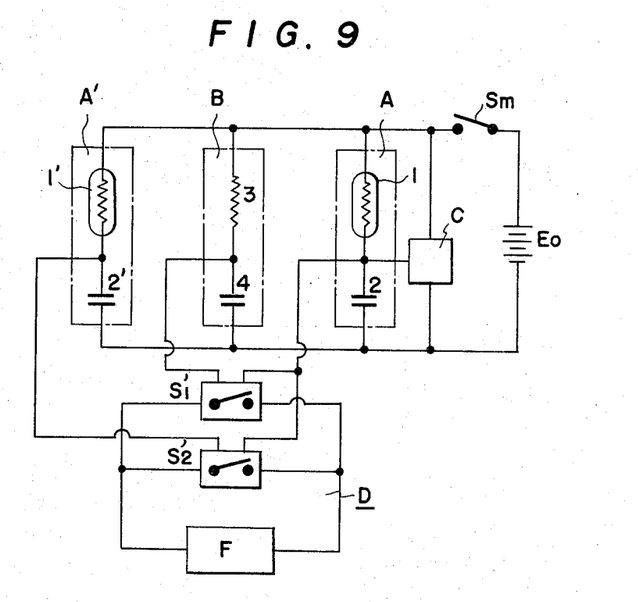
FIG. 9 is a block diagram of a second embodiment of the present invention which is capable of changing over automatically to flash photography under adverse light conditions.
Figure 13:
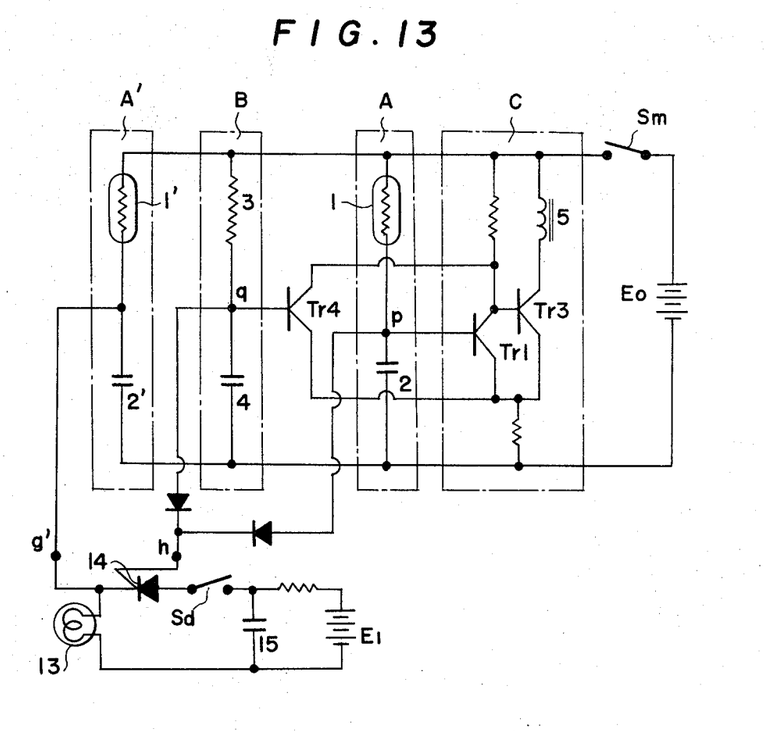
FIG. 13 is a diagram of a circuit used in the second embodiment of FIG. 9.

The second embodiment shown in FIG. 9 the circuit of and FIG. 13 used therewith relates to an electric shutter capable of changing over between daylight EE and the night flash photography and has the capability of responding to the light reflected from an important object under normally adverse light conditions for daylight photography.

Figure 11:
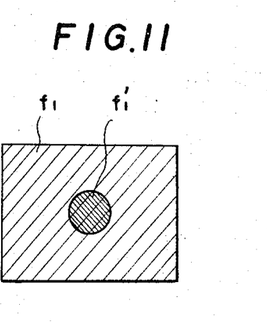
FIG. 11 illustrates two areas of a picture from which respective elements in FIG. 9 receive light.

In the prior art when the background of the important object is very light as shown in FIG. 12(A) and the object is dark and in adverse light conditions so that the contrast between them is too strong, the operator must judge whether or not to use a special flash device for himself and make the necessary arrangements. However, in the third embodiment of the present invention, the flash circuit is opened and closed automatically by being responsive only to a portion of the light reflected from the object and making use of a photometry circuit in which the delay time of the delay circuit is different from that of the delay circuit for the EE photography. The difference in the delay time between two delay circuits is used as a control signal. In the block diagram of the embodiment shown in FIG. 9, A denotes a whole picture photometry (designated as f1 in FIG. 11) delay circuit composed of, photoconductive element 1 for receiving light from almost the whole of the picture and condenser 2, B a delay circuit composed of fixed resistance 3 and condenser 4 and having a fixed delay time, and A' denotes an important object photometry delay circuit composed of photoconductive element 1' for receiving only light rays of the center portion of the picture (designated as f1 in FIG. 11) and condenser 2'. Condensers 2, 4, and 2' are provided respectively with a short-circuit switch to open and close in synchronization (not shown in the drawings).

In the same manner as in the well known prior art, condenser 2 starts to be charged simultaneously with the shutter release and when its charging voltage comes to a fixed value switch circuit C operates to close the shutter.

The voltages across condensers 2, 4 in both delay circuits A, B, when the picture a certain fixed lightness, identical, however, when the picture is darker than this, the delay of circuit A is larger and a voltage difference exists between the voltages across condensers 2, 4. Switch S1 is operated by this voltage difference and is put in flash circuit F.

In this manner, it is possible to obtain an automatic flash device with an electric shutter. And, corresponding to the case wherein the whole picture it is light but an important object is dark and in adverse light conditions, the electric voltage difference between the charging voltage of condenser 2 in circuit A and the charging voltage of condenser 2' circuit A' is detected, and switch S2, operated when the voltage of condenser 2 becomes the larger is connected in parallel to switch K1 in flash circuit F.

A circuit in accordance with the present invention is shown FIG. 13. To power source Eo and power switch Sm, whole picture photometry delay circuit A, composed of photoconductive element 1 for receiving light from the whose surface of the picture and condenser 2 connected in series thereto; fixed delay time delay circuit B, composed resistance 3 and condenser 4; and important object photometry delay circuit A,' composed of photoconductive element 1' to receive light from the center of the picture and condenser 2', are connected in parallel with each other. Connecting point p of photoconductive element 1 in delay circuit A and condenser 2 are connected to the base of first stage transistor Tr1 in the Schmitt circuit forming switch circuit C. The collector is connected to the base of second stage transistor Tr3, and in the collector of Tr1 of transistor Tr3 3 is electromagnet 5 for actuating the shutter closing. Connecting point q of resistance 3 in delay circuit B and condenser 4 is connected to the base of transistor Tr4, and its collector is connected to the collector of transistor Tr1. Points p and q are connected respectively to terminal h through a rectifier, and the other terminal g' is connected to the junction of photoconductive element 1 and condenser 2'.

In the charging circuit composed of power source E1 and condenser 15 there is formed a flash circuit composed of flash lamp 13, SCR14, and synchro switch Sd, and the cathode side of said SCR14 is connected to terminal g' and its gate is connected to terminal h.

Figure 10:
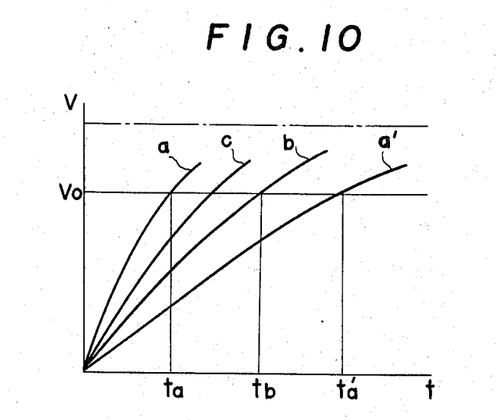
FIG. 10 shows the voltage vs. time relationships of the three delay circuits for the embodiment of FIG. 9

The charging characteristic of condenser 4 in delay circuit B is fixed as shown in FIG. 10b, while the charging characteristic of condenser 2 in delay circuit A is such that when the whole surface of the picture is light it is located to the left side of curve b as shown by curve a and when the whole surface of the picture is dark it is located to the right of curve b as shown by curve a'. On the other hand, the charging characteristic of delay circuit A' is changed in accordance with the lightness of an important object, and when the lightness of the center portion of the picture is nearly the same as that of the whole surface of the picture, it coincides with curve a or curve a', and when there is a difference between them, for example, it corresponds to curve c.

Therefore, as shown in FIG. 12(B) when the background of the picture and an important object are both light coincidentally, voltage V'g of point g', voltage Vp of point p and Vq of point q have the following relation:

$$V'g \approx Vp > Vq$$

Therefore, by the voltage of point p the Schmitt circuit is operated and daylight EE photography is effected, and the flash is not lit.

And, shown in FIG. 12(C) when the whole of the picture is dark the following relation is formed:

$$V'g \approx Vp > Vq$$

Therefore, by $Vq$, the Schmidt circuit is operated by Vq and SCR14 is conductive to light flash lamp 13 to effect flash photography.

Figure 12:
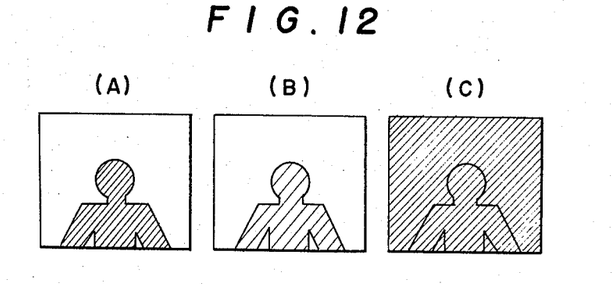
FIG. 12(A) shows an adverse light condition.
FIG. 12(B) shows a condition suitable for ordinary EE.
FIG. 12(C) shows an underexposure photography condition

And, as shown FIG. 12 (A) when the background is light and the important object is dark, $$Vp > Vq > V'g$$

Therefore, by $Vp$ the Schmitt circuit is operated by Vp and effects the ordinary EE exposure and at the same time SCR14 in the flash circuit is also conductive to light flash lamp 13.

Figure 14:
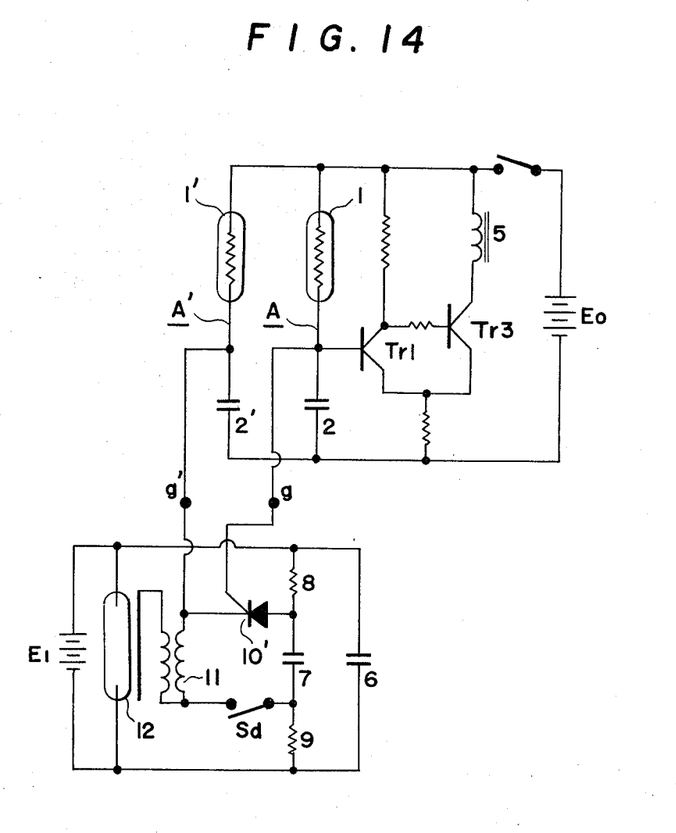
FIG. 14 is a diagram of a modified circuit embodiment for use in the second embodiment of FIG. 9.

The embodiment shown in FIG. 14 is a modified embodiment of the second embodiment described above, which changes between daylight EE photography and adverse light flash photography by means of delay circuits A and A' excluding delay circuit B. Flash discharge tube 12 is energized by SCR10 is put to use in the same manner as in the first embodiment shown in FIG. 3.

In this case, in accordance with the brightness distribution of an object, daylight EE photography is effected under favorable light conditions, and daylight flash photography is effected under adverse light.

I claim:

1. An automatic exposure control device for a camera having a shutter mechanism, comprising:
    a first delay circuit for providing a first output including means responsive to the object brightness and a first device for storing an electrical signal in accordance with the response of said responsive means;
    a second delay circuit for providing a second output including means for varying the delay of said circuit in accordance with a desired flash control time and a second device for storing an electrical signal representing said delay; an electric power source for energizing said first and second delay circuits;
    a switching circuit for controlling the timing of said shutter mechanism and including first and second inputs respectively connected to receive said first and second outputs; and
    a flash firing circuit including flash means and switch means for actuating said flash means, said switch means are responsive to said first and second outputs to actuate said flash means when said second output exceeds said first output.

2. A device as in claim 1 further comprising an indicating circuit actuated by said second output exceeding said first output, and said switch means is responsive to the actuation of said indicating circuit to actuate said flash means.

3. A device as in claim 2 wherein said indicating circuit includes an indicating lamp and a silicon controlled rectifier for actuating said lamp and including a gate connected to said first output and a cathode connected to said second output, and
    said switch means includes a control terminal connected to said indicating lamp whereby lighting of said lamp effects actuation of said switch means.

4. A device as in claim 1 further comprising an indicating circuit actuated by said second output exceeding said first output.

5. An automatic exposure control device for a camera having a shutter mechanism, comprising:
    a first delay circuit for providing a first output and including first means responsive to the over-all brightness of the object and a first device for storing an electrical signal in accordance with the response of said first means;
    a second delay circuit for providing a second output and including second means responsive to the brightness from a selected portion of said object and second means for storing an electrical signal in accordance with the response of said second means;
    a third delay circuit including means for varying the delay of said circuit and third means for storing an electrical signal representing said delay;
    an electric power source for energizing said first, second and third delay circuits;
    a switching circuit responsive to said first and third outputs for actuating said shutter mechanism;
    a flash firing circuit including flash means and first switch means for actuating said flash means;
    said first switch means is responsive to said first and third outputs when said first output is less than said third output to actuate said flash means, and
    said first switch means is responsive to said first, second and third outputs to actuate said flash means when said first output exceeds said third output and said third output exceeds said second output.

6. An automatic exposure control device for a camera having a shutter mechanism, comprising:
    a first delay circuit for providing a first output and including first means responsive to the over-all brightness of the object and a first device for storing an electrical signal in accordance with the response of said first means;
    a second delay circuit for providing a second output and including second means responsive to the brightness from a selected portion of said object and second means for storing an electrical signal in accordance with the response of said second means;
    an electric power source for energizing said first and second delay circuits;
    a switching circuit responsive to said first output for actuating said shutter mechanism;
    a flash firing circuit including flash means and switch means for actuating said flash means; and
    said switch means is responsive to said first output exceeding said second output to actuate said flash means.

* * * * *

UNITED STATES PATENT OFFICE
CERTIFICATE OF CORRECTION

Patent No. 3,667,357            Dated June 6, 1972

Inventor(s) Motonobu Matsuda

It is certified that error appears in the above-identified patent and that said Letters Patent are hereby corrected as shown below:

IN THE DRAWINGS:

In Figure 3 on sheet 2, the commonly connected electrodes of transistors Tr1, Tr2 and Tr4 should be identified as the emitter electrodes and transistors Tr1, Tr2 and Tr4 are of the type illustrated in box 71 of the Electrical Symbols on page 141 of the Rules of Practice - January 1970. The electrode of transistor Tr3 connected to the contact of switch Sm should be identified as the emitter electrode and transistor Tr3 is of the type illustrated in box 72 of the aforesaid Electrical Symbols.

In Figure 3 on sheet 2, the dotted line indicating circuit B should not include transistor Tr4.

In Figure 7 on sheet 3, the commonly connected electrodes of transistors Tr1, Tr3 and Tr4 should be identified as the emitter electrodes and transistors Tr1, Tr3 and Tr4 are of the type illustrated in box 71 of the aforesaid Electrical Symbols.

In Figure 13 on sheet 5, the commonly connected electrodes of transistors Tr1, Tr3 and Tr4 should be identified as the emitter electrodes and transistors Tr1, Tr3 and Tr4 are of the type illustrated in box 72 of the aforesaid Electrical Symbols.

In Figure 14 on sheet 6, the commonly connected electrodes of transistors Tr1 and Tr3 should be identified as the emitter electrodes and transistors Tr1 and Tr3 are of the type illustrated in box 72 of the aforesaid Electrical Symbols.

Signed and sealed this 2nd day of January 1973.

(SEAL)
Attest:

EDWARD M. FLETCHER, JR.
Attesting Officer

ROBERT GOTTSCHALK
Commissioner of Patents